United States Patent
Balasuriya et al.

(10) Patent No.: US 6,980,821 B2
(45) Date of Patent: Dec. 27, 2005

(54) CALL CENTER ACCESS IN A PUSH TO TALK BASED CALL SYSTEM

(75) Inventors: Senaka Balasuriya, Westmont, IL (US); Gregory W. Cox, Schaumburg, IL (US); Steven Upp, Bartlett, IL (US); Walter L. Johnson, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 473 days.

(21) Appl. No.: 10/167,840

(22) Filed: Jun. 12, 2002

(65) Prior Publication Data

US 2003/0232623 A1 Dec. 18, 2003

(51) Int. Cl.⁷ .............................................. H04B 7/00
(52) U.S. Cl. .................. 455/518; 455/519; 455/445; 379/32.01; 379/32.02; 379/32.03; 379/32.04; 379/32.05
(58) Field of Search ................................ 455/515–521, 455/90.1, 90.2, 426; 379/137, 138, 139, 141, 379/32.01, 32.02, 32.03, 32.04, 32.05

(56) References Cited

U.S. PATENT DOCUMENTS

| 5,841,854 | A  | * | 11/1998 | Schumacher et al. ..   | 379/265.11 |
| 6,314,177 | B1 | * | 11/2001 | Davis et al. ...........   | 379/265.12 |
| 6,473,505 | B1 | * | 10/2002 | Khuc et al. ............   | 379/265.01 |
| 6,744,858 | B1 | * | 6/2004  | Ryan et al. ...................   | 379/45 |
| 6,766,009 | B2 | * | 7/2004  | Williams et al. ............   | 379/229 |
| 2003/0083086 | A1 | * | 5/2003 | Toyryla et al. .............   | 455/518 |
| 2003/0104827 | A1 | * | 6/2003 | Moran et al. ...............   | 455/466 |
| 2003/0144018 | A1 | * | 7/2003 | Minnick et al. ............   | 455/519 |
| 2003/0211859 | A1 | * | 11/2003 | Chen et al. .................   | 455/518 |
| 2003/0223571 | A1 | * | 12/2003 | Dezonno ...............   | 379/265.09 |

* cited by examiner

*Primary Examiner*—Nay Maung
*Assistant Examiner*—Angelica M. Perez

(57) ABSTRACT

A dispatch based call system configured to contact a call center using a single unique name or number. Multiple users are able to simultaneously dispatch the single generic call center number and communicate with a unique end station or individual at the call center. A user, or subscriber unit, when dispatching a call communicates initially with the service provider infrastructure. The infrastructure then establishes communication with the call center. The call center determines the identifier of an available end station and the subscriber is subsequently connected to the available end station.

17 Claims, 7 Drawing Sheets

CALL CENTER ACCESS IN A PUSH TO TALK BASED CALL SYSTEM

FIELD OF THE INVENTION

The present invention relates generally to communications systems and, more particularly, to providing users in a dispatch based call system access to a dispatch call center.

BACKGROUND

Two-way wireless communication systems incorporating dispatch services are known in the art. Such dispatch services typically include group dispatch to provide communications within a talkgroup as well as private dispatch. A talkgroup is a set of logically associated subscriber units (e.g., in-vehicle mobile and/or hand-held portable radios) capable of engaging in group-wide communications. In normal talkgroup communications, a single subscriber unit of the talkgroup transmits voice information that is received by an infrastructure and re-transmitted to the other subscriber units in the talkgroup in a one to many type of call. The private dispatch service provides a one to one call between two subscriber units in which the infrastructure receives voice from the transmitter and re-transmits the voice to one and only one other subscriber unit.

While these dispatch services provide useful group and private communications, they are unable to communicate with call centers. Call centers enable simultaneous calls to be placed to a well-known generic number, such as a vanity "1-800" number, and be answered by one of several call center end devices, such as customer service representatives. Call centers enable multiple users to contact a single number simultaneously and allow each of the multiple users to communicate with a unique individual at the call center. Unfortunately, known dispatch systems do not enable multiple users to simultaneously dispatch a single number.

DETAILED DESCRIPTION

The present invention generally provides for enabling multiple users in a dispatch service to contact a call center using a single unique name or number. Multiple users are able to simultaneously dispatch the single generic call center number and communicate with a unique individual at the call center. A user, or subscriber unit, when dispatching a call communicates initially with the service provider infrastructure. The infrastructure then establishes communication with the call center. The call center determines the identifier of an available end station and the subscriber is subsequently connected to the available end station.

In a particular embodiment, the present invention encompasses an infrastructure comprising a call center agent that communicates with the call center. The call center agent forwards the identity of the available end station within the call center to the subscriber unit. This enables the subscriber unit to dispatch a call directly to the end station. In another embodiment, the infrastructure comprises an address translator that maintains a mapping between the original call center identifier and an available end station identifier within the call center. The address translator performs address translation for the messages in the call session to enable the subscriber unit to communicate with the available end station. In still another embodiment, a dispatch applications processor in the infrastructure performs the functions of, as described above, the address translator.

The present invention further encompasses a method for the infrastructure to establish communications between a subscriber unit and a unique end station within the call center. The method comprises the steps of initiating a dispatch request from the subscriber unit to the system controller using a selected name corresponding to a desired call center, obtaining an identifier corresponding to an available end station within the desired call center and establishing a connection between the subscriber unit and the available end station.

Figure 1:
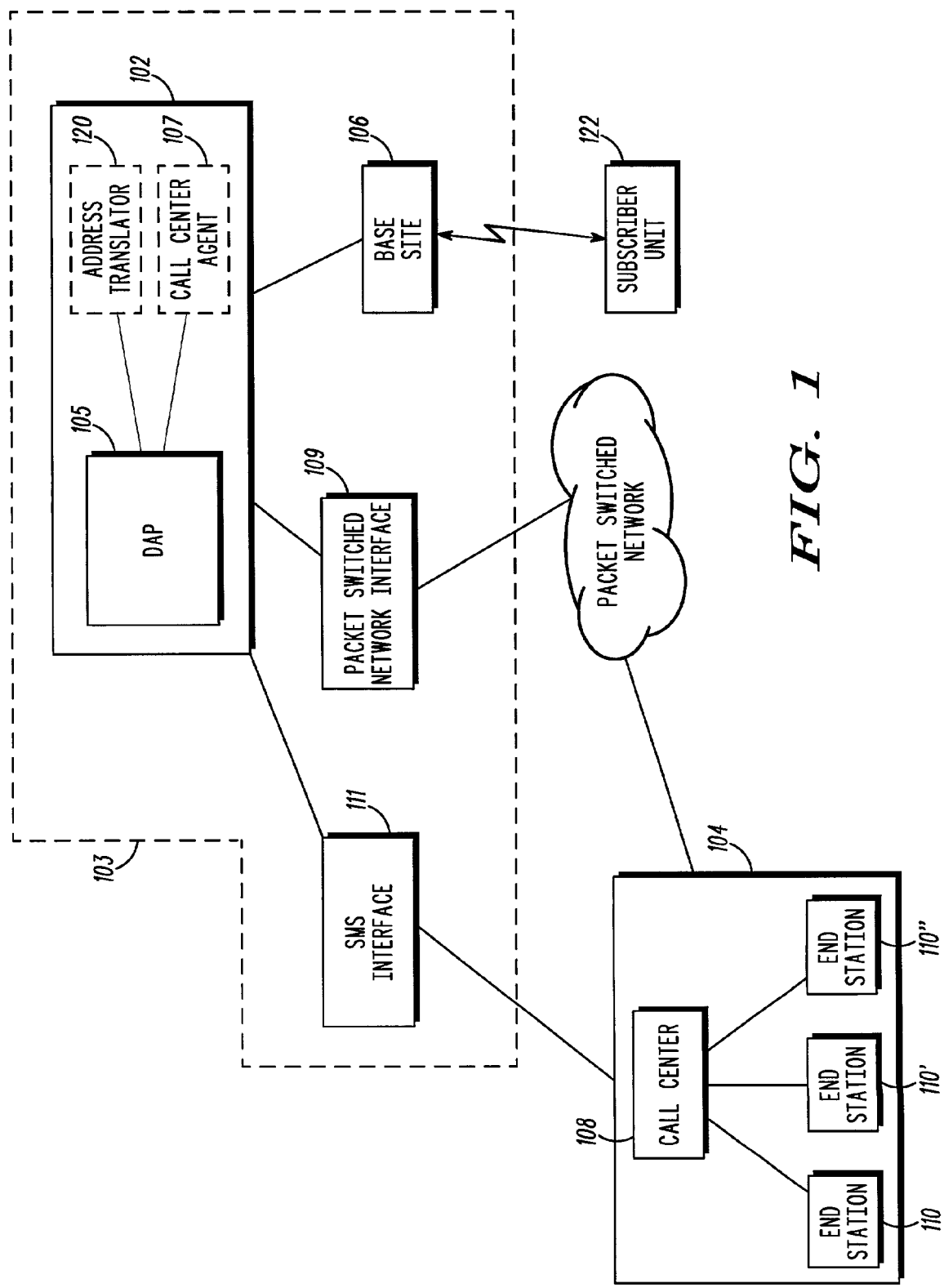
FIG. 1 is a block diagram of a wireless communication system in accordance with the present invention.

The present invention can be more fully understood with reference to FIGS. 1–7. FIG. 1 is a block diagram depiction of a wireless communication system 100 in accordance with a preferred embodiment of the present invention. Communication system 100 comprises at least one mobile wireless communication or subscriber unit 122 in wireless communication with an infrastructure 103 and a dispatch capable call center system 104. The call center system 104 includes a call center 108 and a number of end stations 110, 110', 110". The end stations 110, 110', 110" are typically human customer service representatives or voice response terminals that interact electronically with callers using voice. The call center is equipped with dispatch equipment (not shown), such as iDEN Desktop Dispatch units for enabling an IP-connected personal computer to participate in dispatch calls by way of a gateway. It is to be noted that the call center system 104 may be IP network based as well.

In another aspect of the invention, the call center system 104 functions as an automated device capable of initiating voice communications to end users. For example, a weather tracking station (not shown) initiates a private or group call to a set of participants to provide an update on local weather conditions. The source of the call is identified using a single identifier, but the system initiating the communications is capable of initiating multiple calls simultaneously using many virtual end device interfaces.

The infrastructure 103 comprises those elements normally required to support communications within wireless system 100 and may conform to a CDMA, TDMA, GPRS, GSM or other architecture. By way of example only, the infrastructure 103 comprises an "iDEN" communication system, all components of which are commercially available from "MOTOROLA", Inc. of Schaumburg, Ill. A base site 106 preferably comprises an "iDEN" Enhanced Base Transceiver System (EBTS) and a dispatch controller 102 preferably comprises an "iDEN" Dispatch Application Processor (DAP) 105 and either a call center agent 107 or an address translator 120. The mobile wireless communication unit, or subscriber unit (SU) 122, preferably comprises an "iDEN" wireless phone. Note that multiple call centers and call center agents may be used without compromising the scalability of the system. In addition, reliability may be enhanced by allowing the SU 122 to communicate with multiple call center agents (CCAs). Similarly, multiple address translators may be used as well to enhance reliability and scalability.

For purposes of simplicity, the infrastructure 103 has been limited as shown in FIG. 1. Although not shown, the infrastructure 103 also may include a mobile switching center (MSC) for providing the interface between the public switched telephone network (PSTN) and the iDEN network, a Message Mail Service (MMS) for providing text messaging capabilities, such as short message service (SMS) 111, to subscriber units and Inter-Working Function (IWE) for supporting circuit switched data. In addition, the infrastructure 103, in order to support packet data through a packet switched network, also may include a packet switched network interface 109 such as an iDEN Metro Packet Switch (MPS) and Packet Duplicator. Other equipment also may be provided based on a network operator's particular needs, such as a Mobile Data Gateway (not shown) that is used for providing packet data service. For clarity and ease of understanding, each of the subsequently presented figures illustrates only that portion of the system relevant to the discussion.

Figure 2:
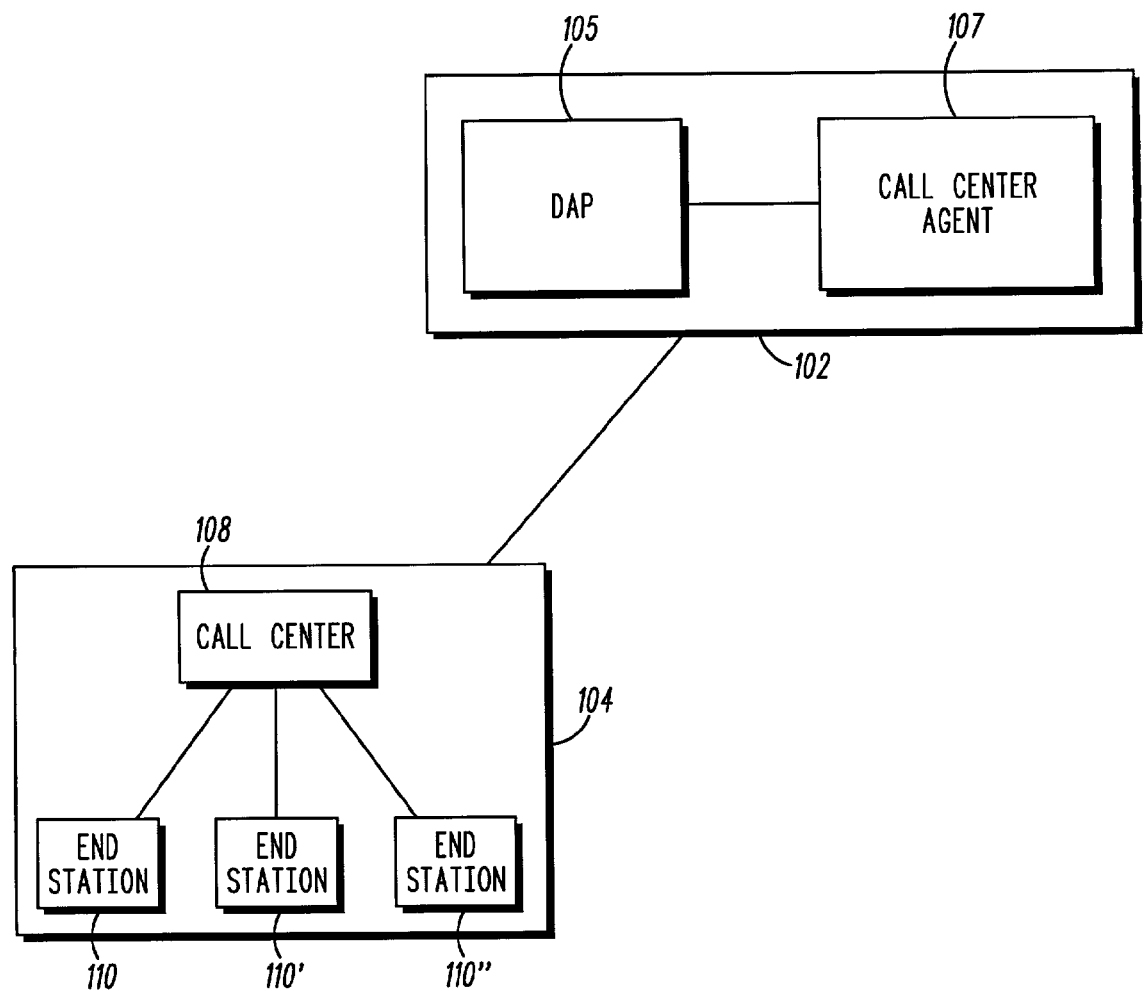
FIG. 2 is a block diagram illustrating operation of the wireless communication system of FIG. 1 in accordance with an embodiment of the present invention.

Referring to FIG. 2, the dispatch controller 102 and call center system 104 are shown. In accordance with a first embodiment, the dispatch controller 102 includes a CCA 107 connected to the DAP 105. The CCA 107, which may be a microprocessor based communications device, communicates with the subscriber unit 112 and the call center 108 using packet-data, SMS or dispatch messages. The CCA 107 functions as an intermediary between the call center 108, the SU 122 and the DAP 105. In particular, the CCA 107 receives a message from the SU 122 requesting dispatch to the call center 108. The CCA 107 contacts the call center 108 and receives the identifier of an available end station. The CCA 107 then relays the identifier to the SU 122, which then dispatches a call to the available end station using the given identifier. In addition, the CCA 107 is capable of communicating with multiple call centers using packet-data, SMS or dispatch messages, as mentioned above. Preferably, the CCA 107 has a directory service such as Lightweight Directory Access Protocol (LDAP) that maintains a mapping between call center identifiers as sent by the SU 122 and assigned call center identifiers to enable a specific call center to be contacted based on its identifier.

Figure 3:
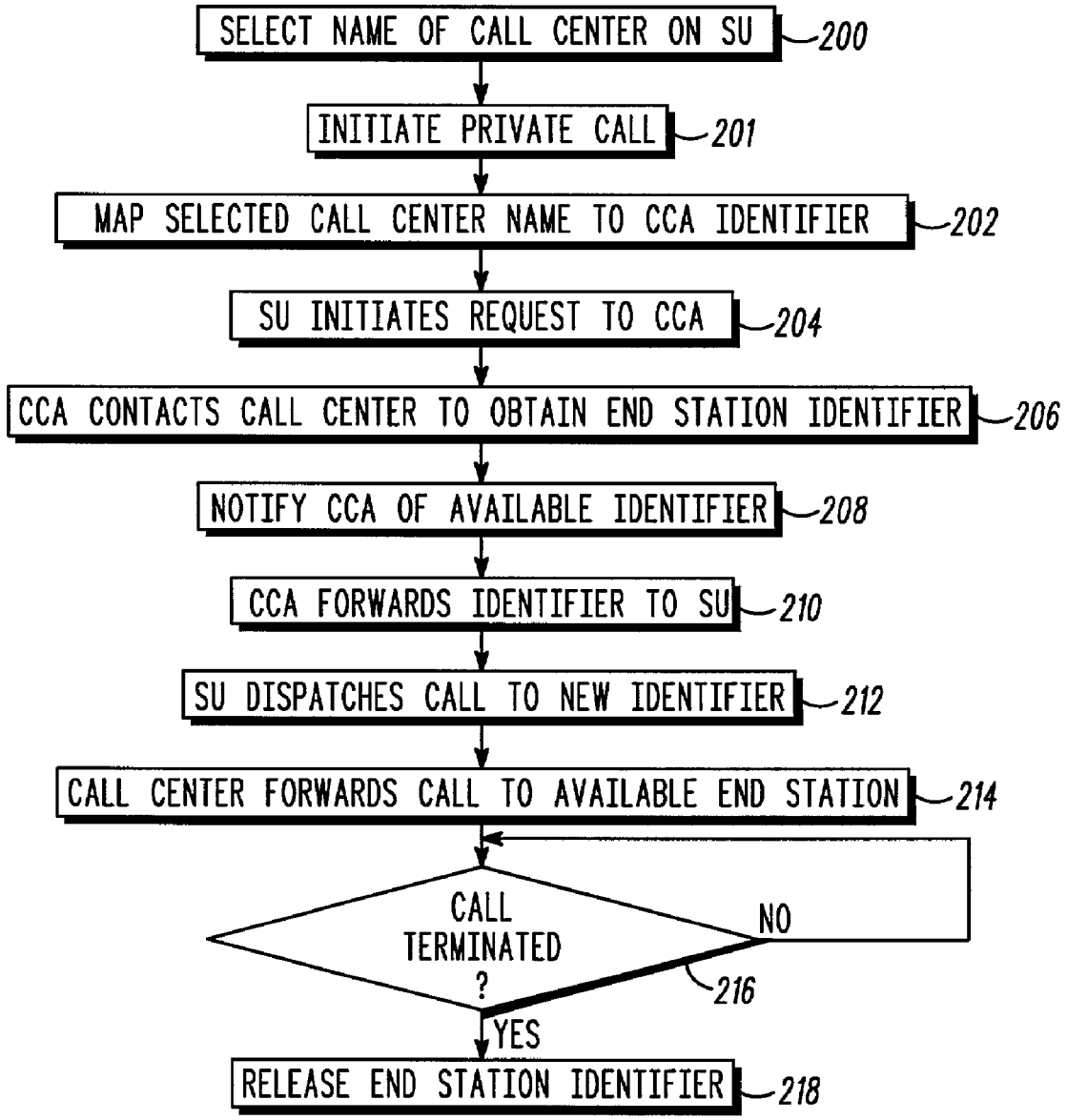
FIG. 3 is a flow chart illustrating a method for use by a call center agent of the wireless communication system of FIG. 2 in accordance with the present invention.

FIG. 3 is flow chart illustrating a method for use by the infrastructure 103. Although the method described in FIG. 3 generally is implemented by the infrastructure 103, the method preferably is carried out by the CCA 107 or by the DAP 105. Also, the functionality illustrated in FIG. 3 may be distributed throughout the infrastructure 103. Generally, the method illustrated in FIG. 3 is implemented as stored software routines that are executed by the platforms on which the software is stored.

Referring to FIG. 3, at step 200, the wireless user selects on the SU 122 the identifier of a particular call center to be contacted. The identifier on the SU 122 is preferably a memorable character string to help identify the call center being contacted. For example, the identifier may be MOTOROLA or 1-800-FLOWERS or similar such names having a strong identity. The user presses the push to talk (PTT) button on the SU 122 to initiate a private call (step 201). In step 202, the SU 122 maps the selected call center name to an identifier belonging to the CCA 107.

The SU 122 initiates a request, with information on the specific call center to be contacted, to the CCA 107 using a packet data, SMS, dispatch system, or other message in step 204. In step 206 the CCA 107 contacts the requested call center 108 through the call center system 104 to obtain an identifier of an available end station 10, 110', 110".

The call center 108 allocates an available identifier in step 208 and notifies the CCA 107 of the available identifier in step 208. There are several ways in which the call center 108 obtains the identity of the available identifier. By way of example and not limitation, the call center 108 is able to obtain the identity of the available identifier from a pool of available identifiers. Alternatively, the call center 108 obtains information regarding available identifiers from its own database. The identifier is preferably reserved for use for a given period of time. If no requests arrive for the reserved identifier before the time period expires, then the identifier is released back to the pool of available identifiers. Although illustrated as two distinct steps, steps 206 and 208 maybe combined for the purposes of the present invention since it is not always necessary to contact the call center 108 for the ID of an available end station. For example, the CCA 107 already may have its own database where the information is stored, or the information may reside on a $3^{rd}$ database accessible by both the CCA 107 and the call center 108.

In step 210, the CCA 107 forwards the identifier to the SU 122 using one of the messaging systems described above. The SU 122 then dispatches a private call to the new identifier in step 212. In step 214, the call center 108, upon receiving the call request from the SU 122, forwards the call request to the particular end station associated with the available identifier, such as the end station 110'. Alternatively, instead of forwarding the call request to the end station 110', the call request maybe provided directly to the SU 122 for a direct connection. In step 216 it is determined whether the call to the available identifier has been terminated. If, the call center 108 releases the identifier back into the pool of available identifiers in step 218. Otherwise, the call continues.

Figure 4:
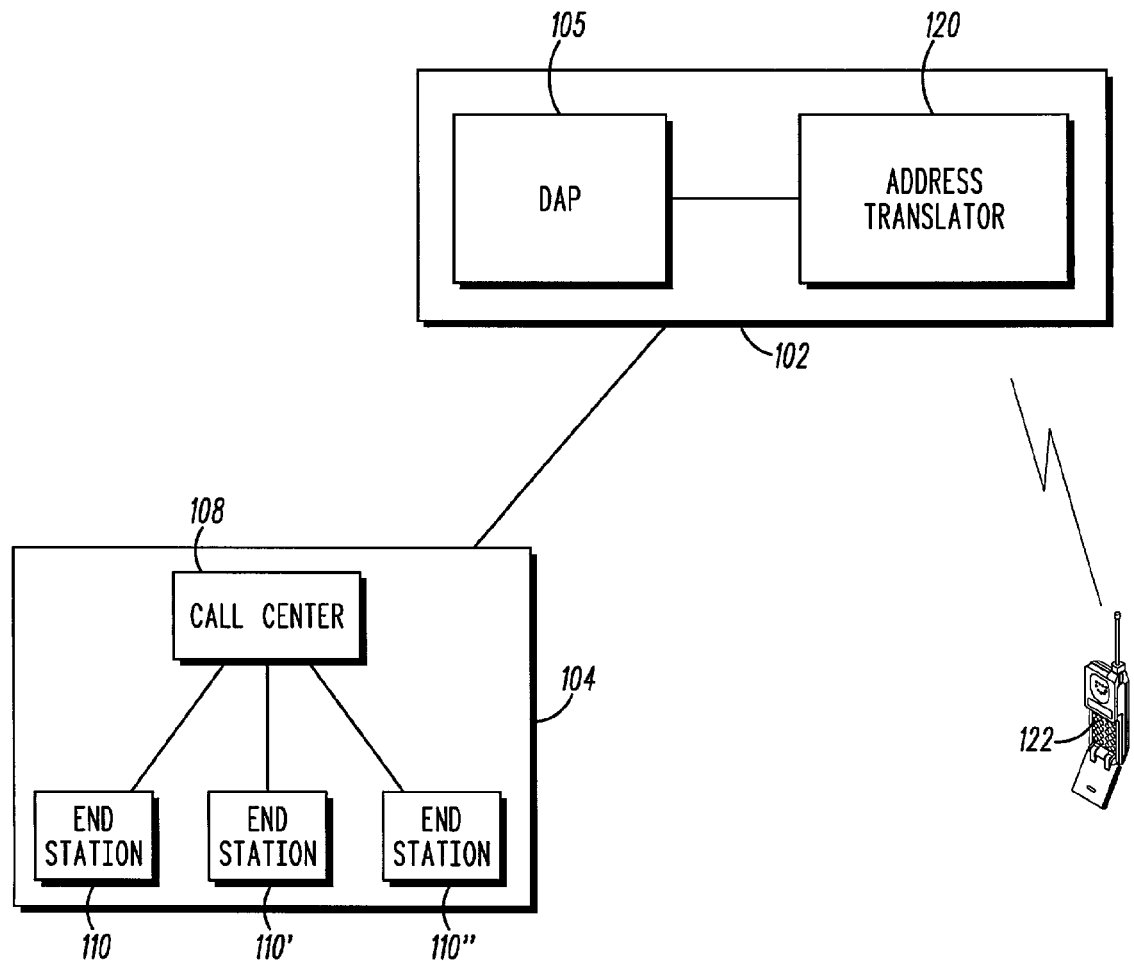
FIG. 4 is a block diagram illustrating operation of the wireless communication system of FIG. 1 in accordance with another embodiment of the present invention.

Referring to FIG. 4, the dispatch controller 102 and call center system 104 are shown in accordance with another embodiment. The dispatch controller 102 includes an address translator 120 in communication with the DAP 105. The address translator 120, which also maybe a microprocessor based communications device, communicates with the call center 108 using packet-data, dispatch or SMS messaging. In operation, the address translator 120 intercepts a call from the SU 122 requesting dispatch to the call center 108. The address translator 120 then contacts the call center 108 using one of the above messaging systems and receives the identifier of an available end station 110'. Alternatively, the address translator 120 is able to obtain available identifier information from a local or remote database populated by the call center 108. Subsequently, the address translater 120 switches the identifier of the call center 108 with the identifier of the end station 110', resulting in the SU 122 dispatching a call to the available end station.

Figure 5:
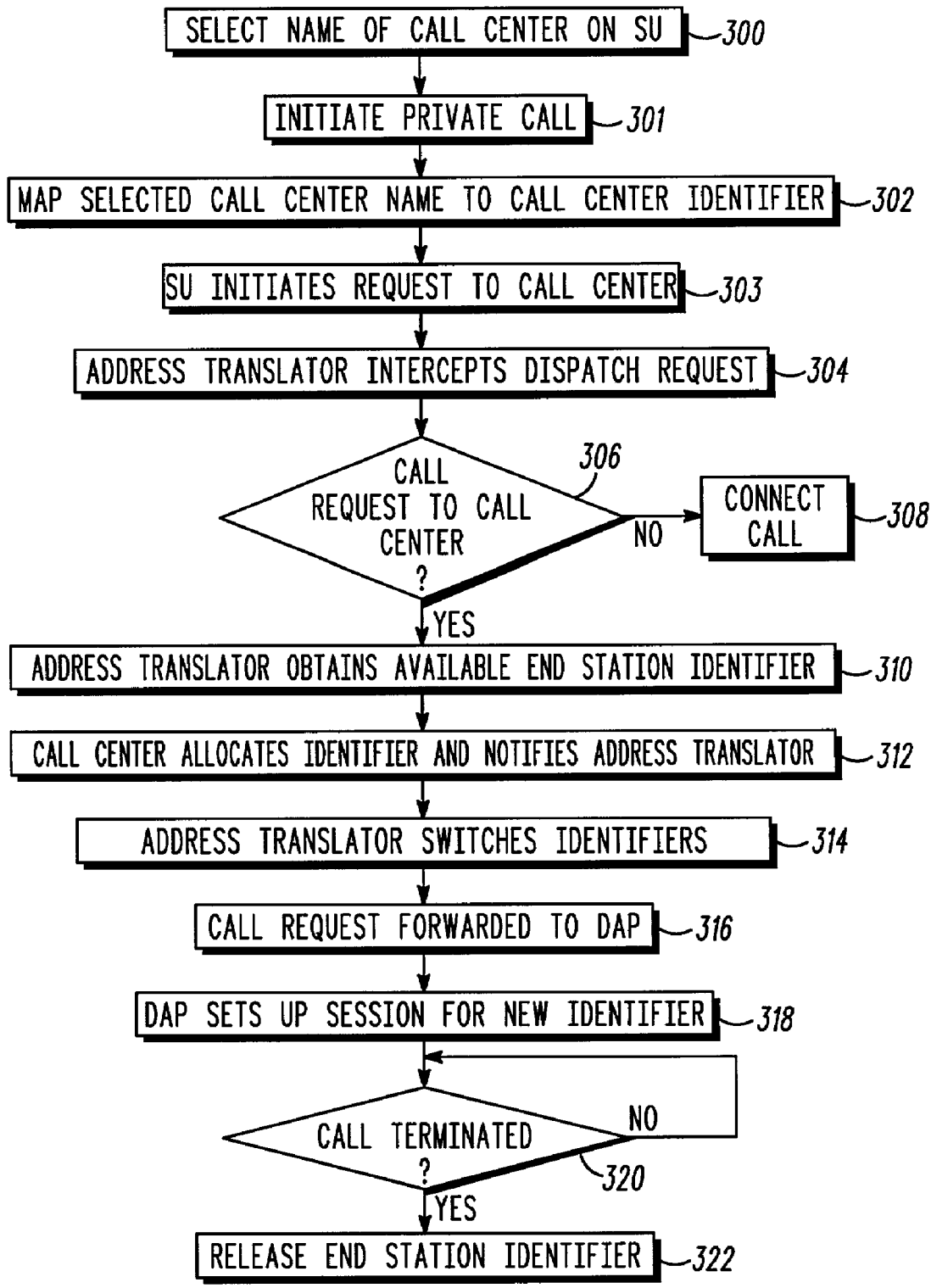
FIG. 5 is a flow chart illustrating a method for use by an address translator of the wireless communication system of FIG. 4 in accordance with the present invention.

FIG. 5 is a flow chart illustrating a method for use by the infrastructure 103. Although the method described in FIG. 5 generally is implemented by the infrastructure 103, the method preferably is carried out by the address translater 120 or by the DAP 105. The functionality illustrated in FIG.

5 may be distributed throughout the infrastructure 103. Generally, the method illustrated in FIG. 5 is implemented as stored software routines that are executed by the platforms in which the software is stored.

Referring to FIG. 5, at step 300 the wireless user selects a particular call center on the SU 122 to be contacted, such as MOTOROLA. The user presses the push to talk (PTT) buttton on the SU 122 to initiate a private call in step 301. In step 302 the SU 122 maps the selected call center name to the call center's generic identifier and initiates a dispatch request in step 303. In step 304 the address translater 120 intercepts the call request and determines in step 306 whether the call request is to a call center. The address translater 120 makes this determination by matching the target address of the call request with a list of identifiers associated with call centers, by matching to a particular ID range allocated for call requests, or by discovering the need to resolve the address to an associated identifier through information retrieved while attempting to route the request. The routing information may be sourced from a Home Location Register. If the call request is to a call center 108, the address translater 120 contacts the call center 108 to obtain a new identifier corresponding to an available end station 110' in the call center 108. The address translater 120 contacts the call center 108 using one of the above messaging systems. Otherwise, if the call request is not to a call center 108, the call is dispatched in its normal manner in step 308.

In step 310 the call center 108 allocates an identifier and notifies the address translater 120 of the newly allocated identifier. Again, the identifier is available only for a predetermined period of time after which it is released back into a pool of available identifiers if a request for the identifier is not made within the predetermined time. In step 314, the address translater 120 switches the target address on the call request from the generic identifier to the newly allocated available identifier. In step 316 the call request is forwarded onwards to the DAP 105. The DAP 105 then sets up a session for the new identifier in step 318. Thus, when the call request is received at the call center 108, it is forwarded to the appropriate end station associated with the available identifier. The address translater 120 maintains a mapping between the original target address and the newly allocated available identifier and performs address translations for all messages in the current call. In step 320, it is determined whether the call has been terminated. Upon termination of the dispatch call in step 318, the call center releases the identifier back into the pool of available identifiers in step 320. Otherwise, the call continues.

Figure 6:
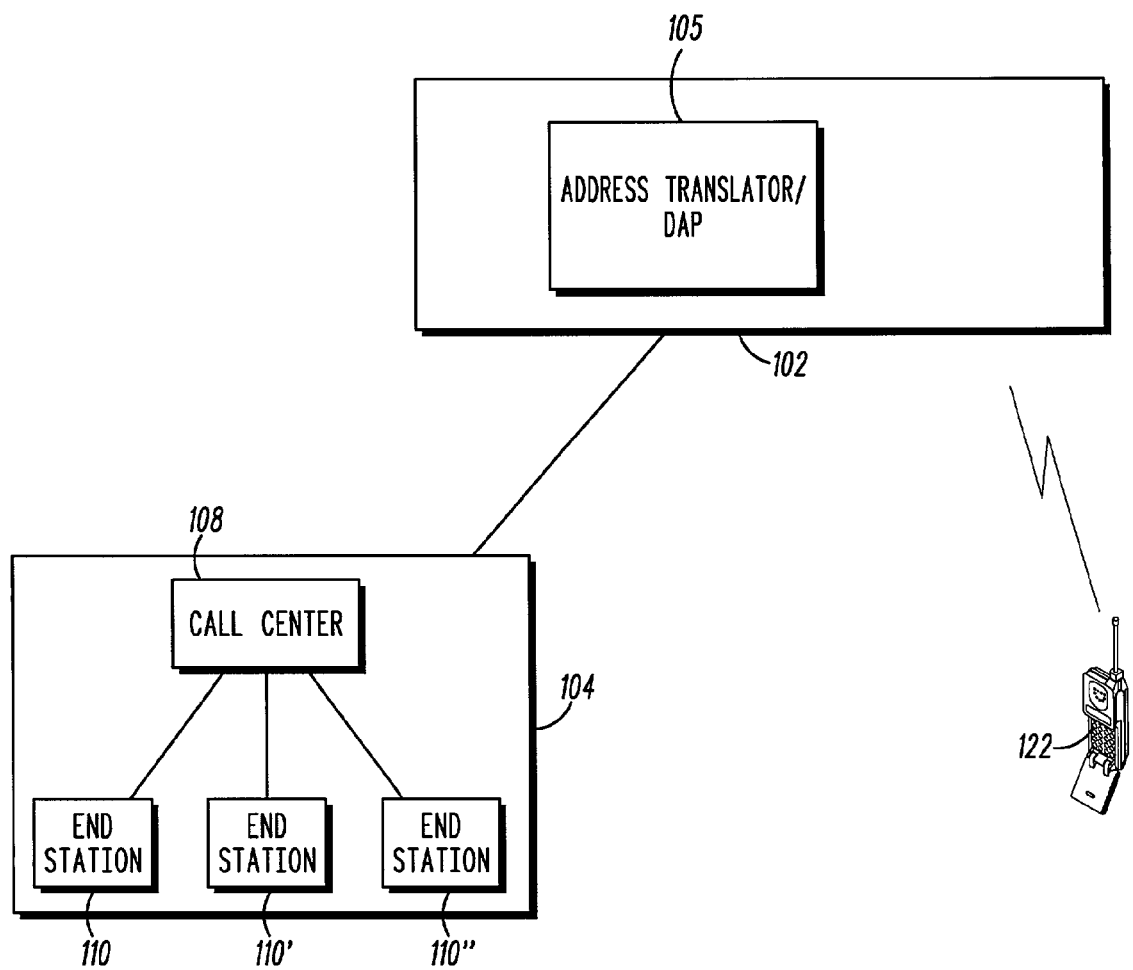
FIG. 6 is a block diagram illustrating operation of the wireless communication system of FIG. 1 in accordance with still another embodiment of the present invention.
Figure 7:
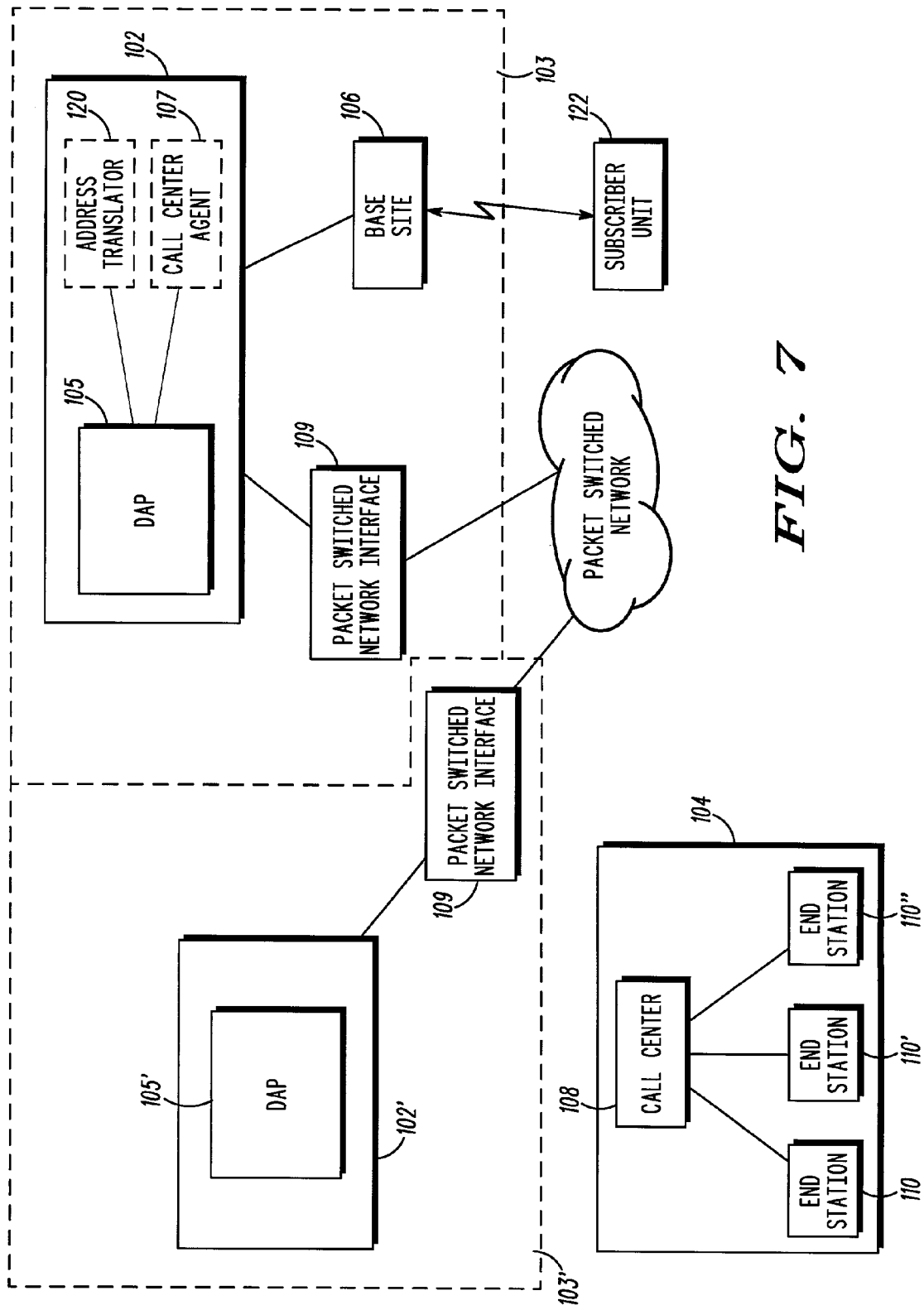
FIG. 7 is a block diagram illustrating operation of an alternate embodiment of a wireless communication in accordance with the present invention.

Referring to FIG. 6, the subscriber unit 122, dispatch controller 102 and call center 108 are shown in accordance with still another embodiment. The DAP 105 performs the address translation functions of the address translater 120 as described above, thereby eliminating the need for the address translater 120. As such, the DAP 105 performs all the functions of the address translater 120. Thus, additional drawings illustrating Applicant's method are not provided. A particular advantage of such a configuration is the cost savings associated with eliminating the address translater.

In another aspect of the invention, the call center system 104 is located remote to the local infrastructure 103 and is connected to a remote infrastructure 103'. The 5 remote infrastructure 103', which includes a DAP 105', communicates with the local DAP 105 over a packet switched interface or IP network. Thus, a local SU 122 is able to dispatch a call to a local call center number as described above, and be connected via the interconnected DAPs 105, 105' to the call center system 104, which is located remote to the subscriber unit 122.

It is to be noted that the 1-800 vanity numbers described above are given only by way of example. In actual operation, accessing the dispatch call center requires the use of a dispatch ID's or other generic identifier instead of a toll-free number. The dispatch ID is numerically different from a PSTN number like 1-800-MOTOROLA. However, call lists on subscriber devices might obscure the difference. For example, an address book entry labeled with the text "1-800-MOTOROLA" may be mapped to a dispatch identification number that is perhaps dynamically assigned. In most cases, a memorable arbitrary text string like "Motorola" or "Mot" is used in the address book and mapped to a dispatch ID.

Although the present invention has been described with reference to certain embodiments, numerous modifications and variations can be made by those skilled in the art without departing from the novel spirit and scope of the present invention.

What is claimed is:

1. In a push to talk communications system comprising a service provider infrastructure, a method for communicating with a call center having at least one end station, the method comprising the steps of:
   initiating a push to talk request from a subscriber unit to the service provider infrastructure using a call center identifier corresponding to a call center;
   intercepting the push to talk request sent by the subscriber unit wherein the push to talk request is intercepted by a controller in the service provider infrastructure;
   obtaining an identifier corresponding to an available end station from among a plurality of end stations within the call center to provide an end station identifier;
   providing the end station identifier to the controller;
   providing from the controller to the subscriber unit the end station identifier; and
   establishing a push to talk session between the subscriber unit and the end station using the end station identifier.

2. The method of claim 1, wherein the initiating step comprises the step of mapping a selected name to the call center identifier corresponding to the call center.

3. The method of claim 2, wherein the obtaining step comprises the steps of:
   determining whether the push to talk request sent by the subscriber unit is to the call center;
   contacting the call center to obtain the end station identifier of the end station;
   obtaining the end station identifier;
   providing the end station identifier to a system controller; and
   switching messages from the call center identifier to the end station identifier and from the end station identifier to the call center identifier.

4. The method of claim 3, wherein the contacting step with the call center is established using anyone or more selected from a group of a short message service, a data communications network, and a dispatch message service.

5. The method of claim 2, wherein the establishing step comprises the steps of:
   switching from the call center identifier to the end station identifier; and
   maintaining a mapping for translating addresses between the call center identifier and the end station identifier.

6. The method of claim 1 further comprising the step of releasing the end station identifier when communication between the subscriber unit and the call center is terminated.

7. The method of claim 5 further comprising the step of deleting the mapping when communication between the subscriber unit and the call center is terminated.

8. The method of claim 5 further comprising the step of deleting the mapping when communication between the subscriber unit and the call center does not occur within a predetermined time period.

9. The method of claim 5 further comprising the step of storing the mapping when communication between the subscriber unit and the call center is terminated.

10. The method of claim 9 further comprising the step of determining whether the end station in the stored mapping is available when a subsequent push to talk request is made to the call center.

11. The method of claim 10 further comprising the step of sending the subsequent push to talk request to the end station in the stored mapping if the end station is available.

12. The method of claim 1, wherein the obtaining step comprises the step of forwarding the end station identifier to the subscriber unit.

13. The method of claim 12, wherein the establishing step comprises the step of the subscriber unit sending a push to talk request to the end station using the end station identifier.

14. The method of claim 1, wherein the mapping is maintained by a device in the infrastructure.

15. The method of claim 4, wherein the data communications network comprises a data packet capable network.

16. A push to talk communications system for enabling a subscriber unit to communicate with a call center, the system comprising:

a call center having a plurality end stations; and an infrastructure for processing push to talk requests to the call center, the infrastructure comprising a push to talk application processor for controlling communications between the subscriber unit and the call center and a call center agent for obtaining an identifier of an available end station from among a plurality of end stations at the call center and for forwarding the end station identifier to the subscriber unit so that a push to talk session is established between the subscriber unit and the available end station.

17. The push to talk communications system of claim 16, wherein the infrastructure includes an address translator for obtaining an identifier of an end station to provide an end station identifier and for switching from a call center identifier corresponding to the call center to the end station identifier.

* * * * *